(12) United States Patent
Caruso et al.

(10) Patent No.: US 9,897,065 B2
(45) Date of Patent: Feb. 20, 2018

(54) MODULAR WIND TURBINE ROTOR BLADES AND METHODS OF ASSEMBLING SAME

(71) Applicant: General Electric Company, Schenectady, NY (US)

(72) Inventors: Christopher Daniel Caruso, Greenville, SC (US); Aaron A. Yarbrough, Clemson, SC (US); Daniel Alan Hynum, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 14/753,142

(22) Filed: Jun. 29, 2015

(65) Prior Publication Data

US 2016/0377048 A1 Dec. 29, 2016

(51) Int. Cl.
*F03D 1/00* (2006.01)
*F03D 1/06* (2006.01)
(Continued)

(52) U.S. Cl.
CPC .............. *F03D 1/001* (2013.01); *B23P 15/04* (2013.01); *B29C 65/78* (2013.01); *F03D 1/0675* (2013.01);
(Continued)

(58) Field of Classification Search
CPC ........ F03D 1/001; F03D 13/10; F03D 1/0675; B23P 15/04; B29C 65/78;
(Continued)

(56) References Cited

U.S. PATENT DOCUMENTS 2,884,078 A 4/1959 Stamm et al.
4,329,119 A 5/1982 Baskin
(Continued)

FOREIGN PATENT DOCUMENTS

AU 2011304537 B2 3/2012
CA 2517951 A1 9/2004
(Continued)

OTHER PUBLICATIONS

European Search Report and Opinion issued in connection with corresponding EP Application No. 16176261.2 dated Nov. 23, 2016.
(Continued)

*Primary Examiner* — John C Hong
(74) *Attorney, Agent, or Firm* — Dority & Manning, P.A.

(57) ABSTRACT

The present disclosure is directed to a method for assembling a modular rotor blade of a wind turbine. The method includes providing a pre-formed blade root section and a pre-formed blade tip section of the rotor blade. Further, the blade root section includes one or more spar caps extending in a generally span-wise direction. Another step includes providing at least one pre-formed blade segment of the rotor blade. The method also includes mounting the at least one blade segment around the one or more spar caps of the blade root section, wherein the at least one blade segment includes a chord-wise cross-section having multiple joints, wherein at least one joint is located on at least one of a pressure side surface or a suction side surface. In addition, the method also includes joining the blade tip section to at least one of the one or more spar caps or the at least one blade segment.

14 Claims, 15 Drawing Sheets

(51) Int. Cl.
  *B23P 15/04* (2006.01)
  *B29C 65/78* (2006.01)
  *F03D 13/10* (2016.01)
(52) U.S. Cl.
  CPC .......... *F03D 13/10* (2016.05); *F05B 2230/50* (2013.01); *F05B 2230/60* (2013.01); *F05B 2240/302* (2013.01); *F05B 2280/4007* (2013.01); *Y02E 10/721* (2013.01); *Y02P 70/523* (2015.11)
(58) Field of Classification Search
  CPC .......... F05B 2280/4007; F05B 2230/50; F05B 2230/60; F05B 2240/302
  See application file for complete search history.

(56) References Cited

U.S. PATENT DOCUMENTS

| | | |
|---|---|---|
| 4,474,536 A | 10/1984 | Gougeon et al. |
| 5,476,704 A | 12/1995 | Köhler |
| 6,264,877 B1 | 7/2001 | Pallu De La Barriere |
| 7,473,385 B2 | 1/2009 | Stiesdal et al. |
| 7,503,752 B2 | 3/2009 | Gunneskov et al. |
| 7,625,185 B2 | 12/2009 | Wobben |
| 7,637,721 B2 | 12/2009 | Driver et al. |
| 7,654,799 B2 | 2/2010 | Eyb |
| 7,854,594 B2 | 12/2010 | Judge |
| 7,922,454 B1 | 4/2011 | Riddell |
| 8,057,189 B2 | 11/2011 | Riahi |
| 8,079,818 B2 | 12/2011 | Burchardt et al. |
| 8,114,329 B2 | 2/2012 | Karem |
| 8,142,162 B2 | 3/2012 | Godsk et al. |
| 8,147,209 B2 | 4/2012 | Godsk et al. |
| 8,168,027 B2 | 5/2012 | Jacobsen et al. |
| 8,172,538 B2 | 5/2012 | Hancock et al. |
| 8,262,361 B2 | 9/2012 | Sanz Pascual et al. |
| 8,297,932 B2 | 10/2012 | Arocena De La Rua et al. |
| 8,297,933 B2 | 10/2012 | Riahi |
| 8,317,479 B2 | 11/2012 | Vronsky et al. |
| 8,348,622 B2 | 1/2013 | Bech |
| 8,353,674 B2 | 1/2013 | Bech |
| 8,455,090 B2 | 6/2013 | Schmidt et al. |
| 8,506,258 B2 | 8/2013 | Baker et al. |
| 8,511,996 B2 | 8/2013 | Llorente Gonzalez et al. |
| 8,517,689 B2 | 8/2013 | Kyriakides et al. |
| 8,540,491 B2 | 9/2013 | Gruhn et al. |
| 8,545,744 B2 | 10/2013 | Jones |
| 8,580,060 B2 | 11/2013 | Bech |
| 8,657,581 B2 | 2/2014 | Pilpel et al. |
| 8,673,106 B1 | 3/2014 | Jolley et al. |
| 8,696,317 B2 | 4/2014 | Rudling |
| 8,747,098 B1 | 6/2014 | Johnson et al. |
| 8,764,401 B2 | 7/2014 | Hayden et al. |
| 8,826,534 B2 | 9/2014 | Cappelli et al. |
| 8,827,655 B2 | 9/2014 | Bech |
| 8,894,374 B2 | 11/2014 | Fuglsang et al. |
| 8,918,997 B2 | 12/2014 | Kyriakides et al. |
| 8,961,142 B2 | 2/2015 | Wansink |
| 8,992,813 B2 | 3/2015 | Robbins et al. |
| 2007/0036659 A1 | 2/2007 | Hibbard |
| 2009/0148300 A1 | 6/2009 | Driver et al. |
| 2010/0098549 A1 | 4/2010 | Mironov |
| 2011/0030183 A1 | 2/2011 | Livingston et al. |
| 2011/0031758 A1 | 2/2011 | Mitsuoka et al. |
| 2011/0037191 A1 | 2/2011 | Stiesdal |
| 2011/0045276 A1 | 2/2011 | Grove-Nielsen |
| 2011/0103962 A1 | 5/2011 | Hayden et al. |
| 2011/0114252 A1 | 5/2011 | Partington et al. |
| 2011/0142662 A1 | 6/2011 | Fritz et al. |
| 2011/0142667 A1 | 6/2011 | Miebach et al. |
| 2011/0318186 A1 | 12/2011 | Kristensen et al. |
| 2012/0034096 A1 | 2/2012 | Appleton |
| 2012/0039720 A1 | 2/2012 | Bech |
| 2012/0180582 A1 | 7/2012 | Piasecki |
| 2012/0183408 A1 | 7/2012 | Noerlem |
| 2012/0230830 A1 | 9/2012 | Lind et al. |
| 2012/0237356 A1 | 9/2012 | Mironov |
| 2012/0257984 A1 | 10/2012 | Frederiksen |
| 2013/0012086 A1 | 1/2013 | Jones et al. |
| 2013/0022466 A1 | 1/2013 | Laurberg |
| 2013/0108453 A1 | 5/2013 | Baker et al. |
| 2013/0149166 A1 | 6/2013 | Schibsbye |
| 2013/0164133 A1 | 6/2013 | Grove-Neilsen |
| 2013/0195661 A1 | 8/2013 | Lind et al. |
| 2013/0231018 A1 | 9/2013 | Kruger et al. |
| 2013/0333823 A1 | 12/2013 | Hedges et al. |
| 2014/0003955 A1 | 1/2014 | Richter |
| 2014/0003956 A1 | 1/2014 | Lull et al. |
| 2014/0023513 A1 | 1/2014 | Johnson et al. |
| 2014/0030094 A1 | 1/2014 | Dahl et al. |
| 2014/0119936 A1 | 5/2014 | Dahl et al. |
| 2014/0140855 A1 | 5/2014 | Arendt et al. |
| 2014/0295187 A1 | 10/2014 | Jacobsen et al. |
| 2015/0224760 A1 | 8/2015 | Eyb et al. |

FOREIGN PATENT DOCUMENTS

| | | |
|---|---|---|
| CA | 2526407 | 12/2004 |
| CN | 201155423 Y | 11/2008 |
| CN | 100476200 C | 4/2009 |
| CN | 101302302 B | 2/2011 |
| CN | 102705157 A | 10/2012 |
| CN | 101906251 B | 6/2013 |
| DE | 102011051172 A1 | 12/2012 |
| DK | 201270816 A | 1/2014 |
| DK | 201270818 A | 1/2014 |
| EP | 2113373 B1 | 1/2011 |
| EP | 2343712 A2 | 7/2011 |
| EP | 2363602 A2 | 9/2011 |
| EP | 2434152 A2 | 3/2012 |
| EP | 2255957 B1 | 7/2013 |
| EP | 2617558 A1 | 7/2013 |
| EP | 2679804 A1 | 1/2014 |
| EP | 2679806 A1 | 1/2014 |
| EP | 2682256 A1 | 1/2014 |
| EP | 2687557 A1 | 1/2014 |
| EP | 2455419 B1 | 3/2014 |
| EP | 1808598 B1 | 4/2014 |
| EP | 2716907 A1 | 4/2014 |
| EP | 2752577 A2 | 7/2014 |
| GB | 2451192 A | 1/2009 |
| GB | 2455044 A | 6/2009 |
| GB | 2464539 A | 4/2010 |
| GB | 2485453 A | 5/2012 |
| JP | 2002137307 A | 5/2002 |
| JP | 2007092716 A | 4/2007 |
| JP | 3930200 B2 | 6/2007 |
| JP | 2009235306 A | 10/2009 |
| JP | 2014015567 A | 1/2014 |
| JP | 5439412 B2 | 3/2014 |
| WO | WO03082551 A1 | 10/2003 |
| WO | WO 2007/051465 A1 | 5/2007 |
| WO | WO 2008/086805 A2 | 7/2008 |
| WO | WO 2009/118545 A1 | 10/2009 |
| WO | WO 2010/025830 A2 | 3/2010 |
| WO | WO 2010/057502 A2 | 5/2010 |
| WO | WO 2010/083921 A2 | 7/2010 |
| WO | WO 2011/088835 A2 | 7/2011 |
| WO | WO 2011/098785 A2 | 8/2011 |
| WO | WO 2011/113812 A1 | 9/2011 |
| WO | WO 2012/010293 A1 | 1/2012 |
| WO | WO 2012/042261 A1 | 4/2012 |
| WO | WO 2012/140039 A2 | 10/2012 |
| WO | WO 2012/161741 A2 | 11/2012 |
| WO | WO 2013/007351 A1 | 1/2013 |
| WO | WO 2013/060582 A1 | 5/2013 |
| WO | WO 2013/087078 A1 | 6/2013 |
| WO | WO 2013/091639 A2 | 6/2013 |
| WO | WO 2013/178228 A1 | 12/2013 |
| WO | WO 2014/001537 A1 | 1/2014 |
| WO | WO 2014/044280 A1 | 3/2014 |
| WO | WO 2014/063944 A1 | 5/2014 |

(56) References Cited

FOREIGN PATENT DOCUMENTS

| | | |
|---|---|---|
| WO | WO 2014/079456 A1 | 5/2014 |
| WO | WO 2014/079565 A2 | 5/2014 |
| WO | WO 2015/015202 A1 | 2/2015 |

OTHER PUBLICATIONS

European Search Report and Opinion issued in connection with corresponding European Application No. 16176262.0 dated Nov. 22, 2016.
Co-pending U.S. Appl. No. 14/188,756, filed Feb. 25, 2014.

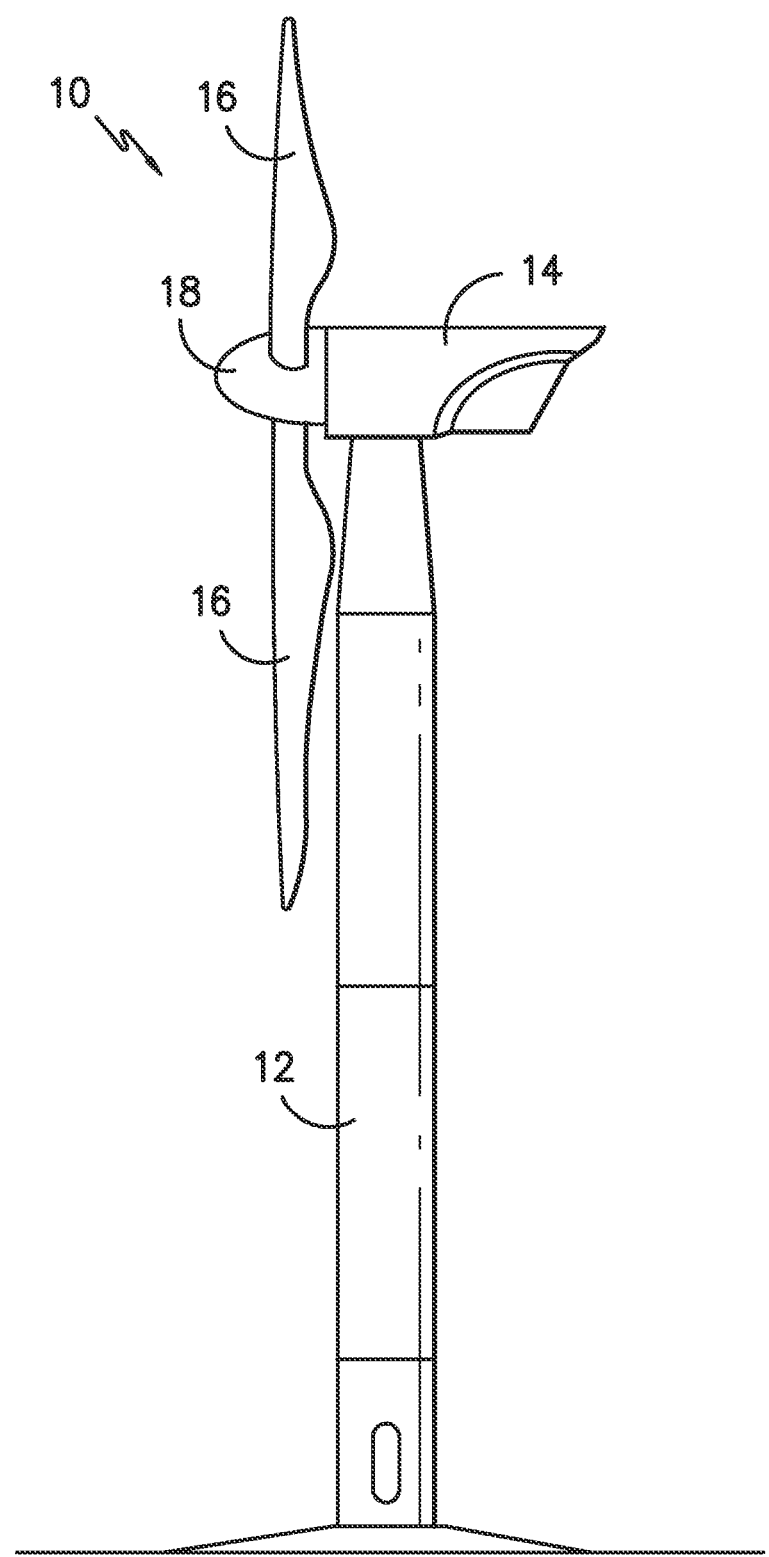
FIG. -1-

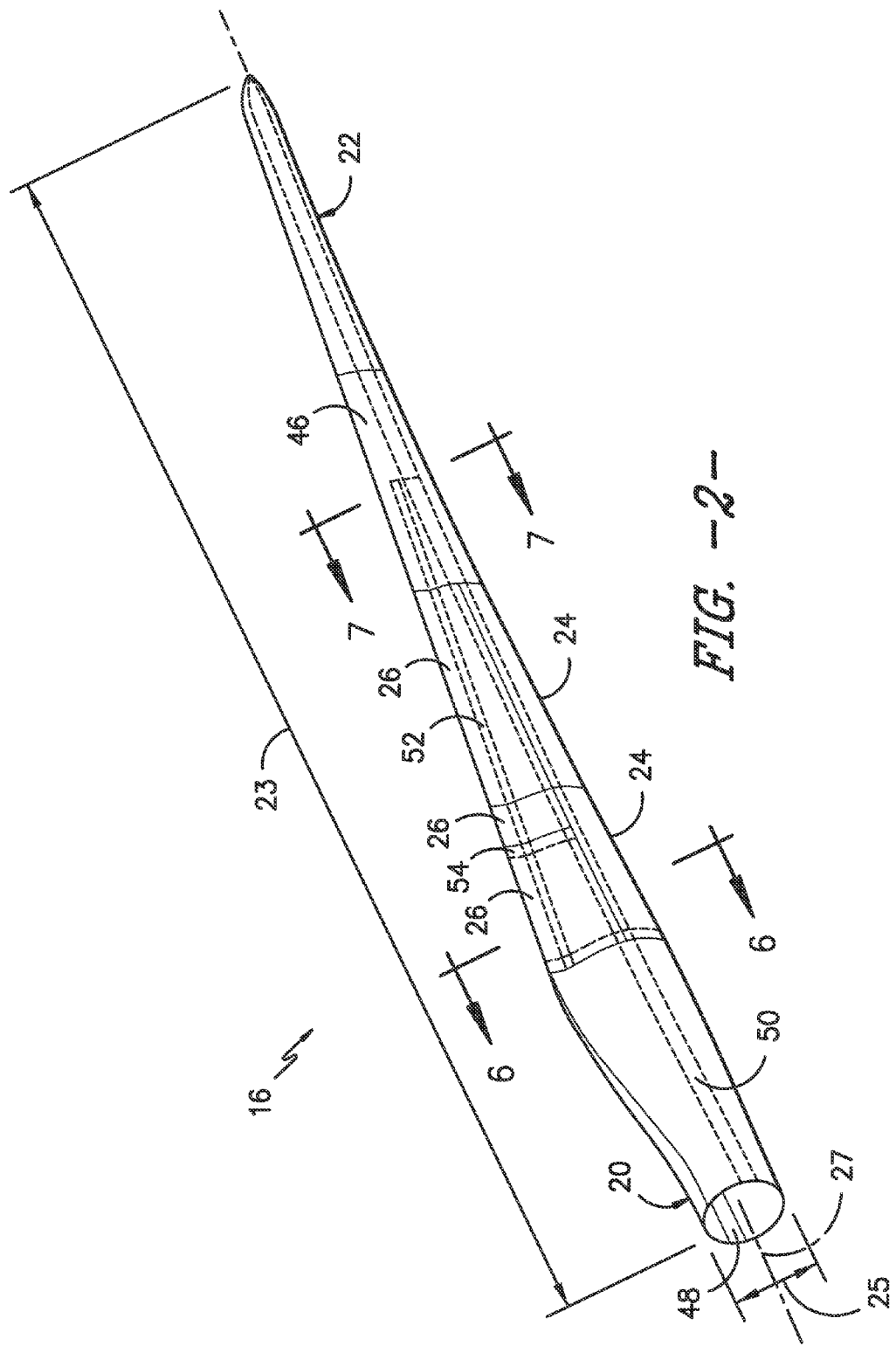

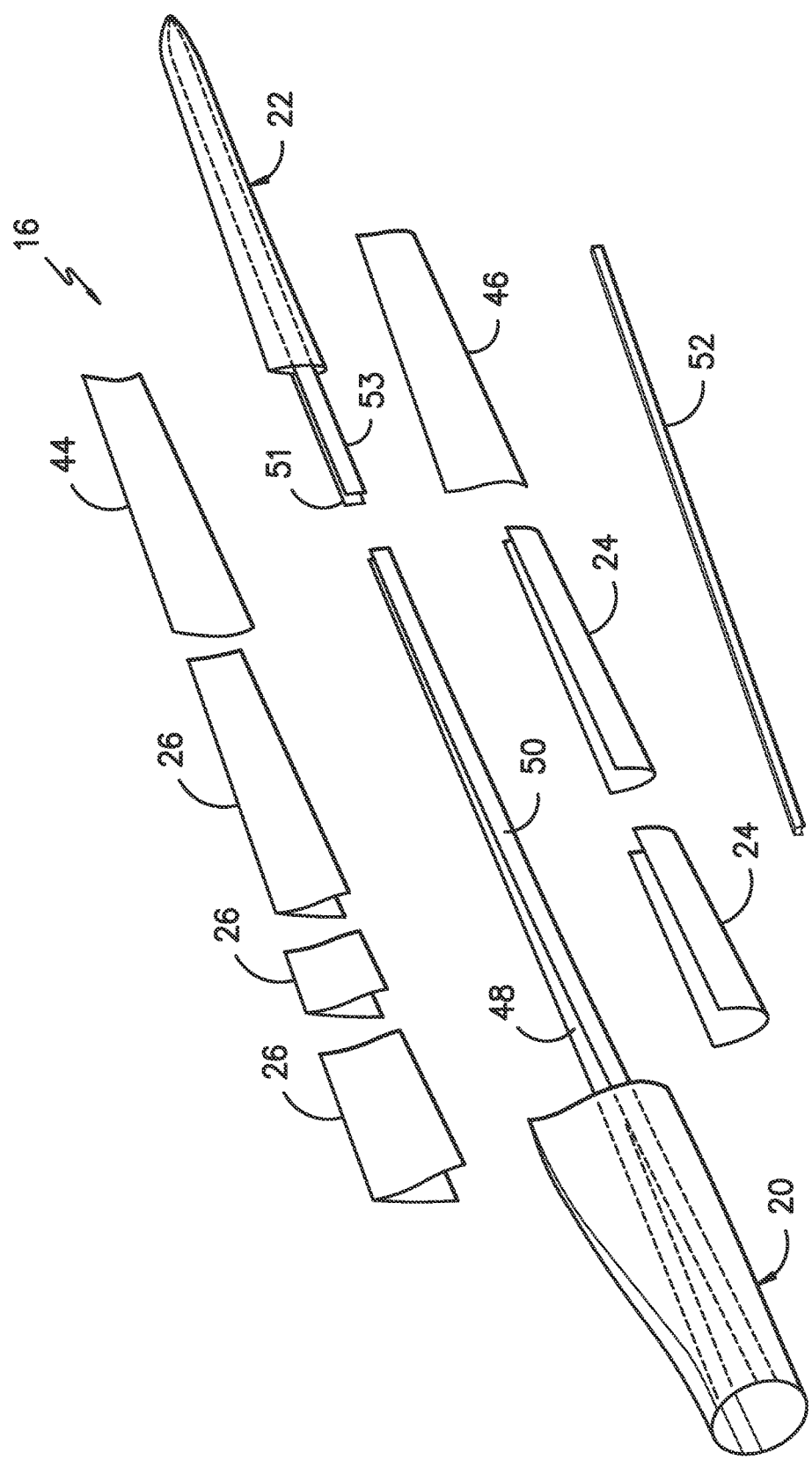

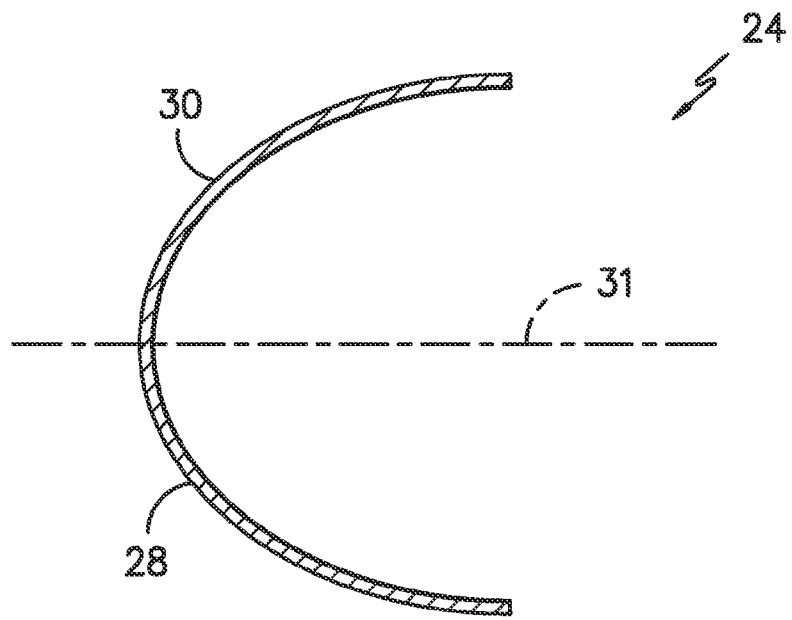
FIG. -4-
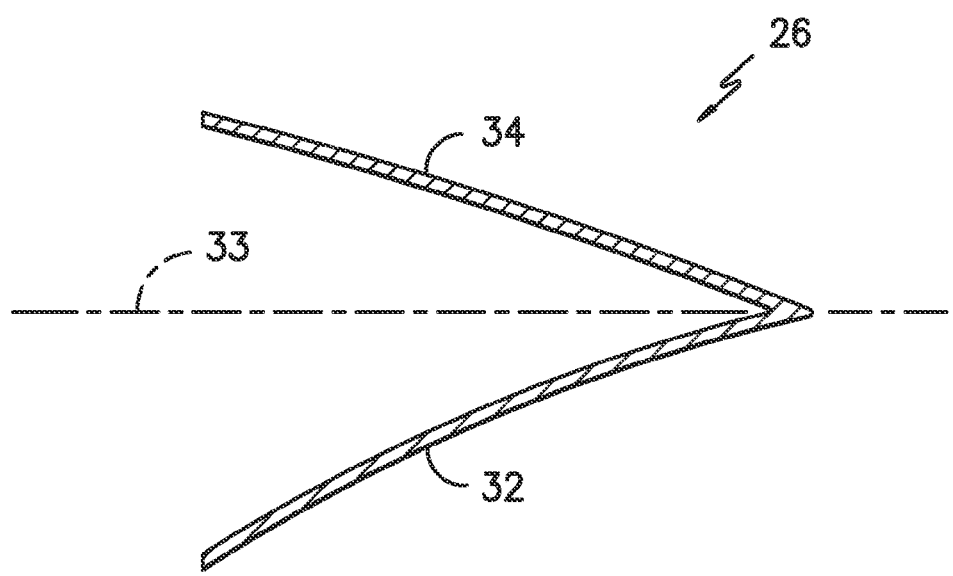
FIG. -5-

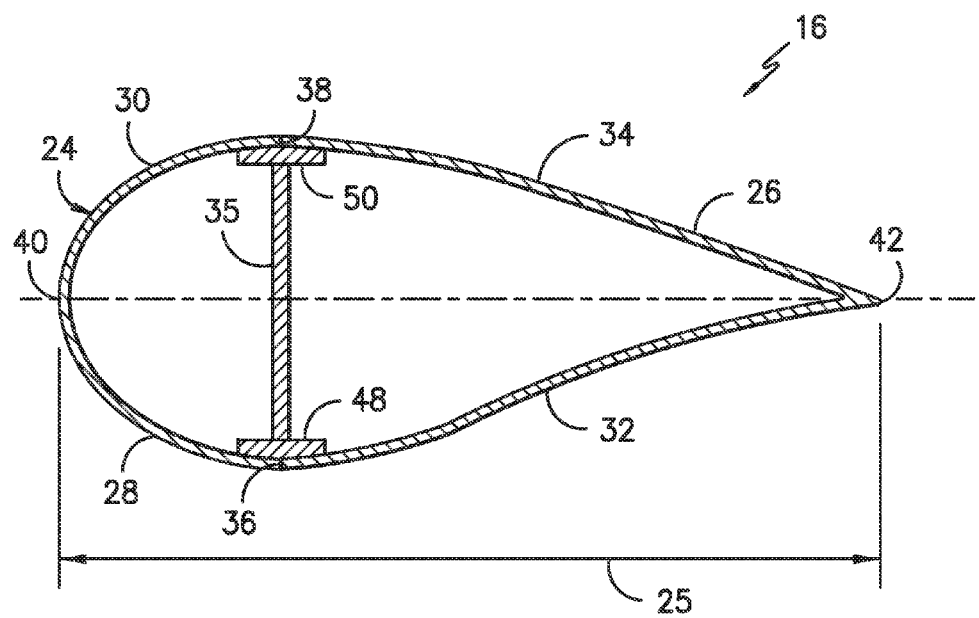
FIG. -6-
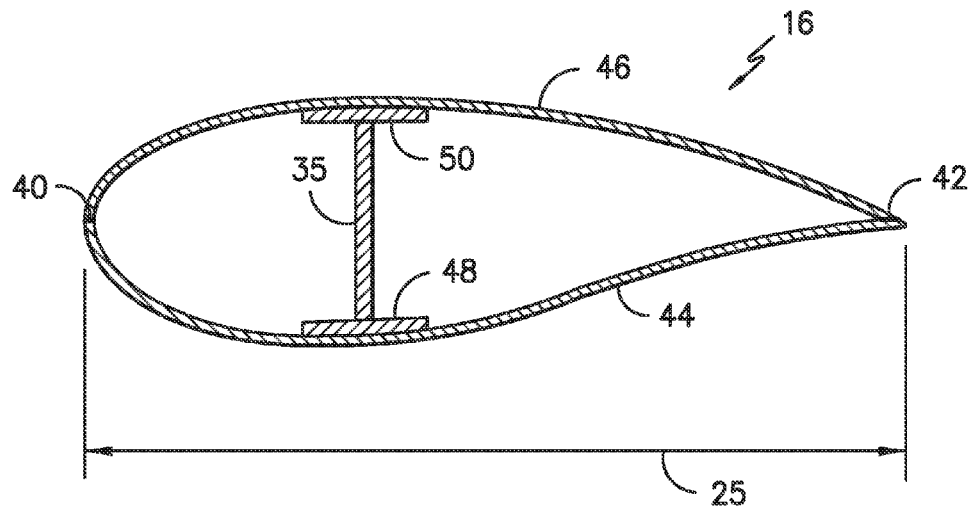
FIG. -7-

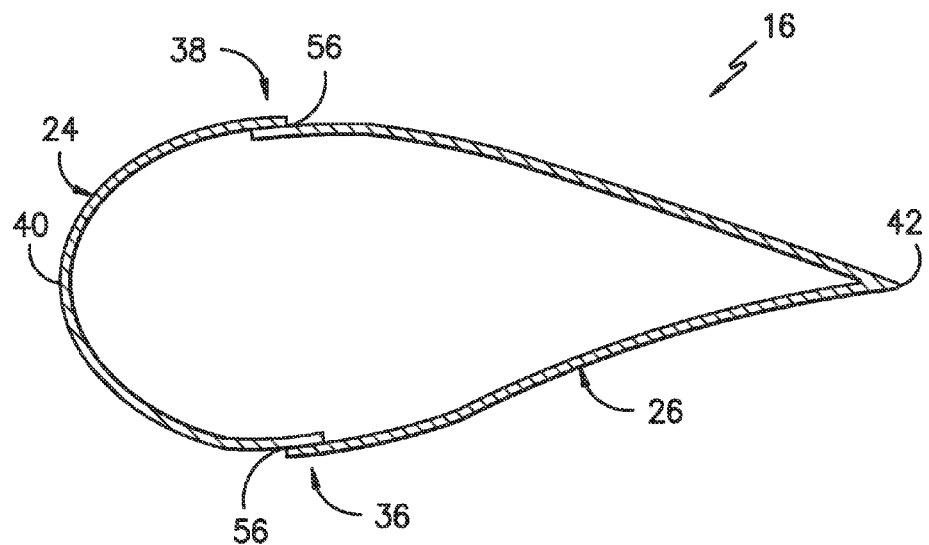
FIG. -8-
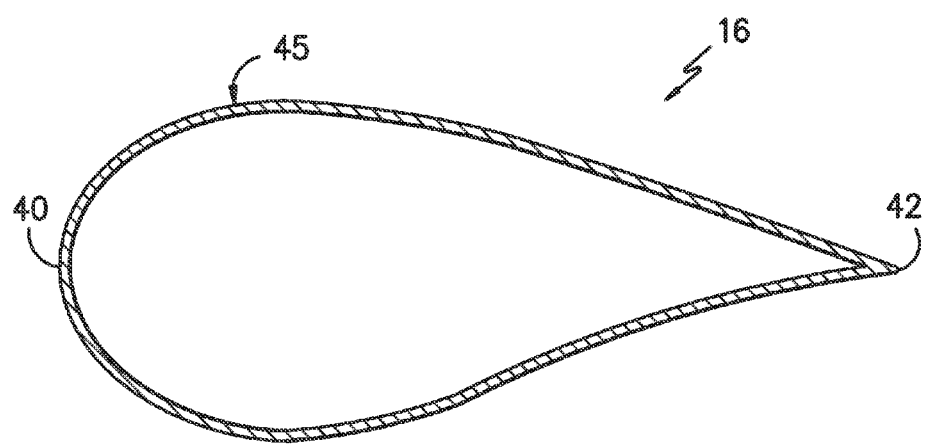
FIG. -9-

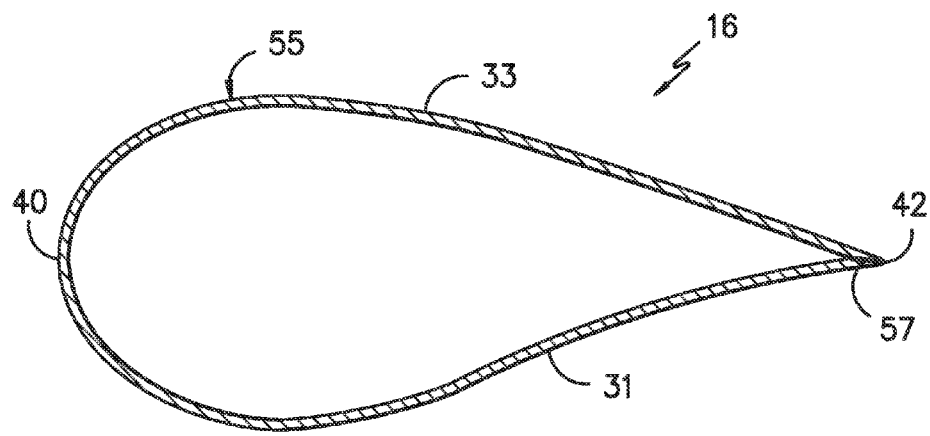
FIG. -10-
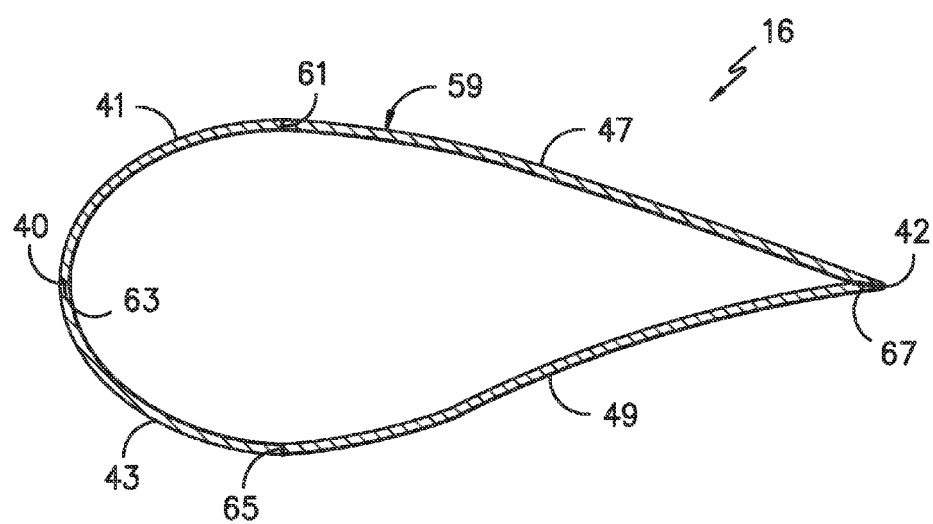
FIG. -11-

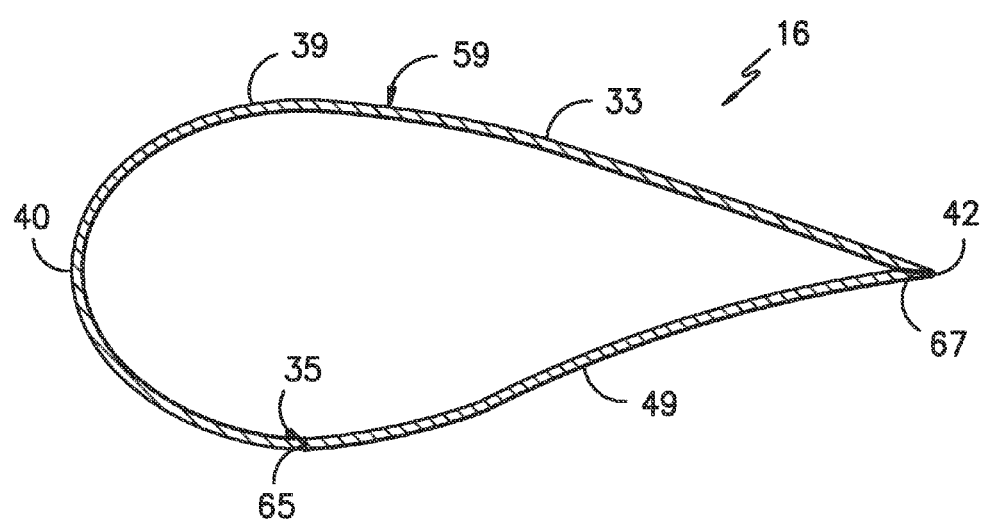
FIG. -12-

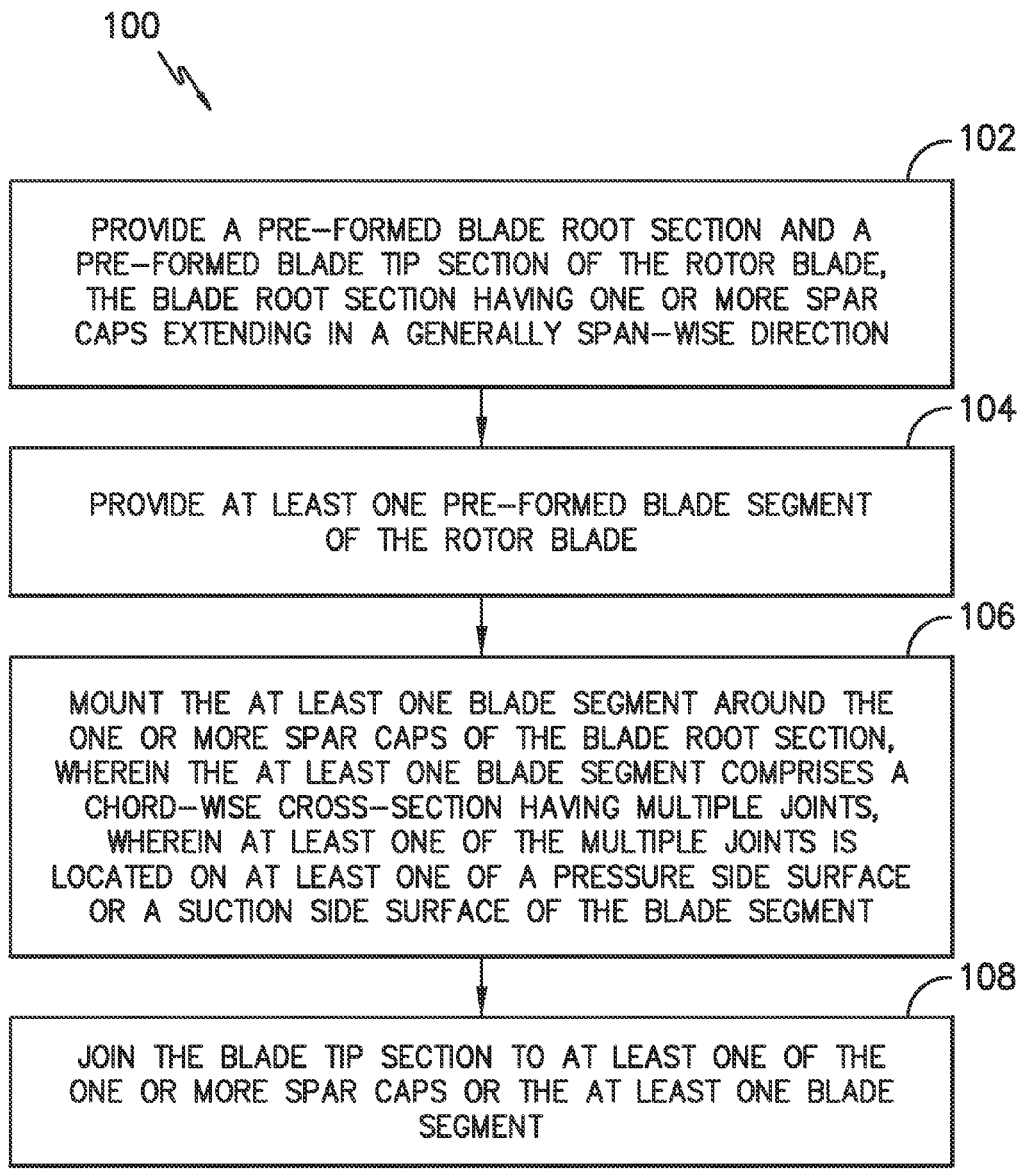
FIG. -13-

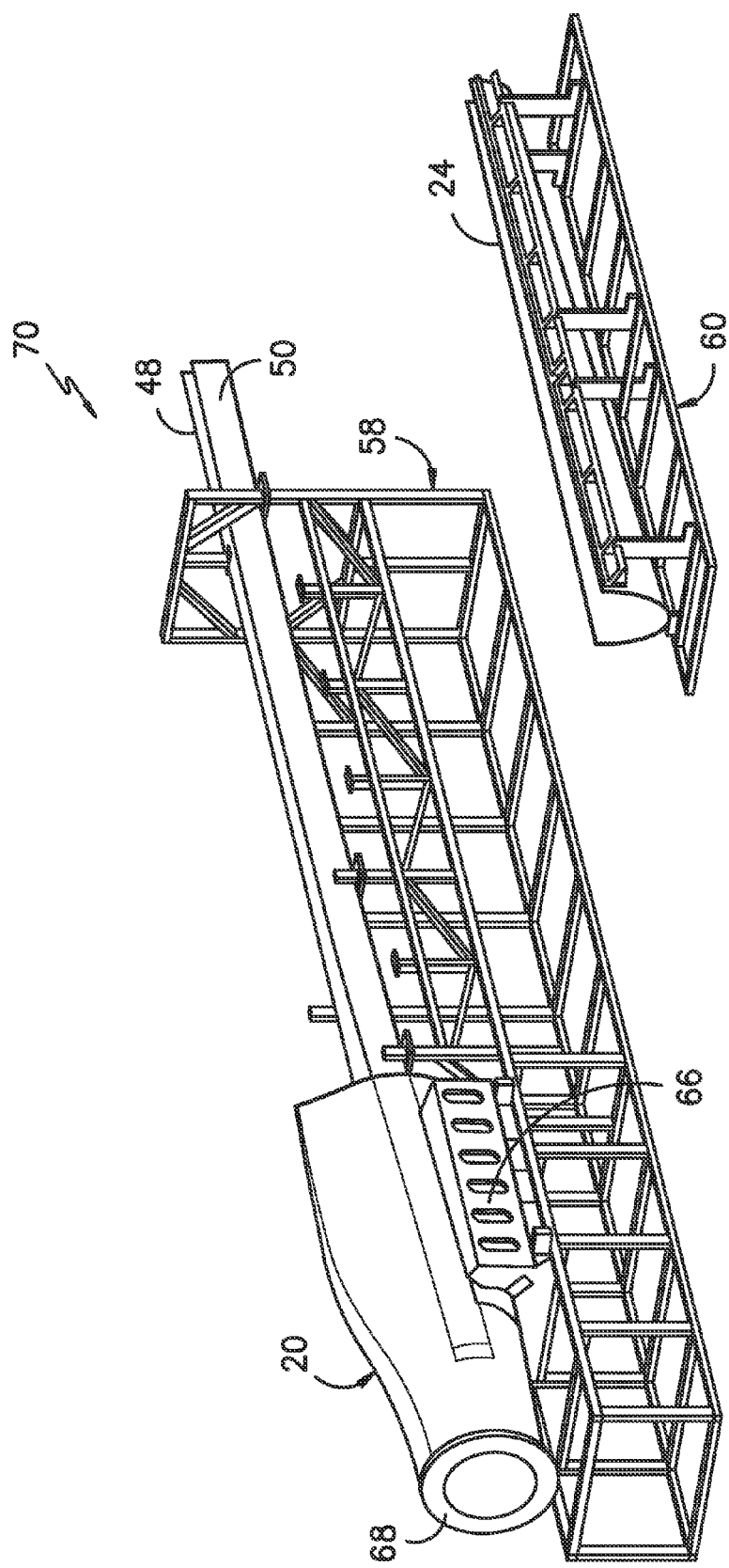
FIG. -14-

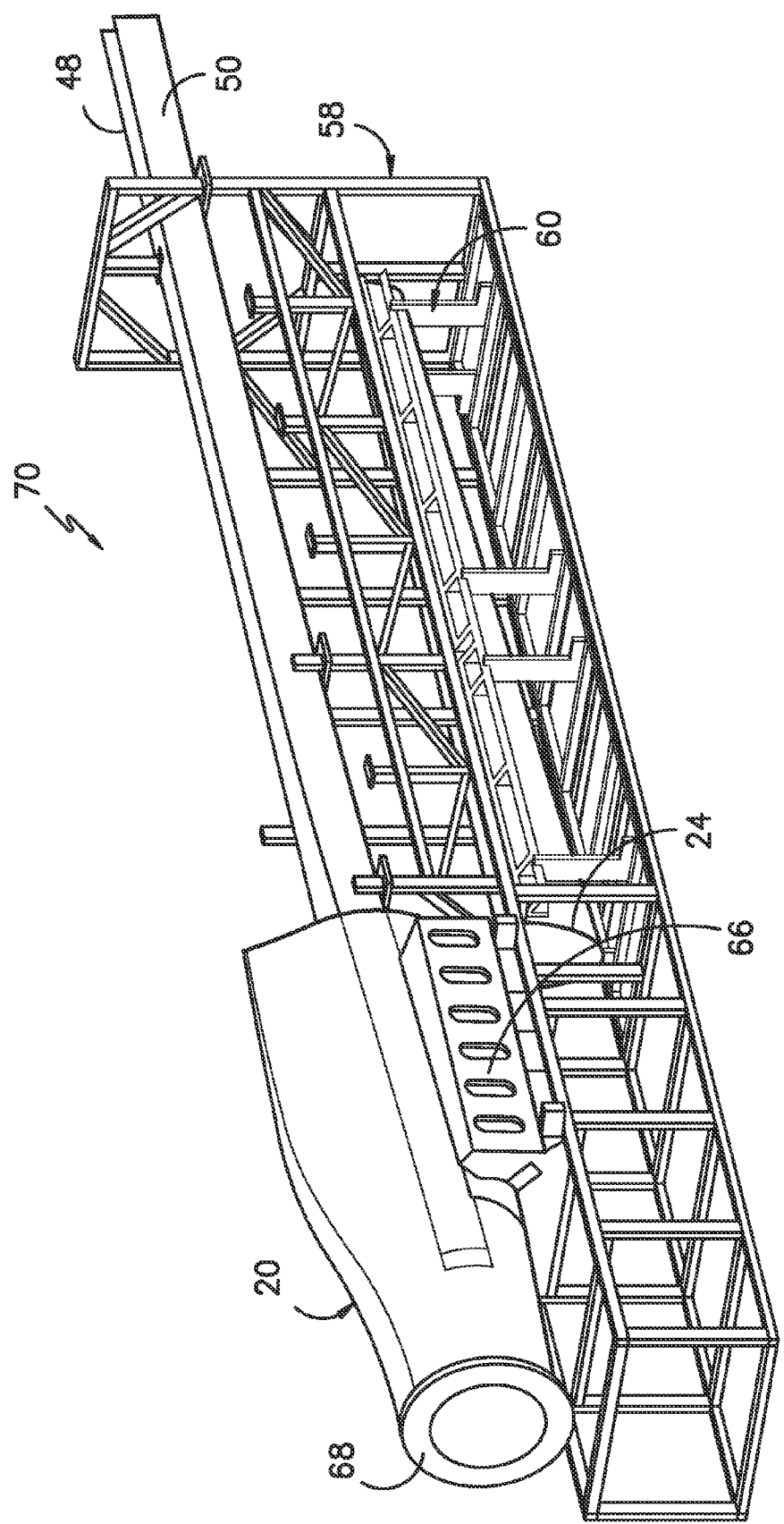
FIG. -15-

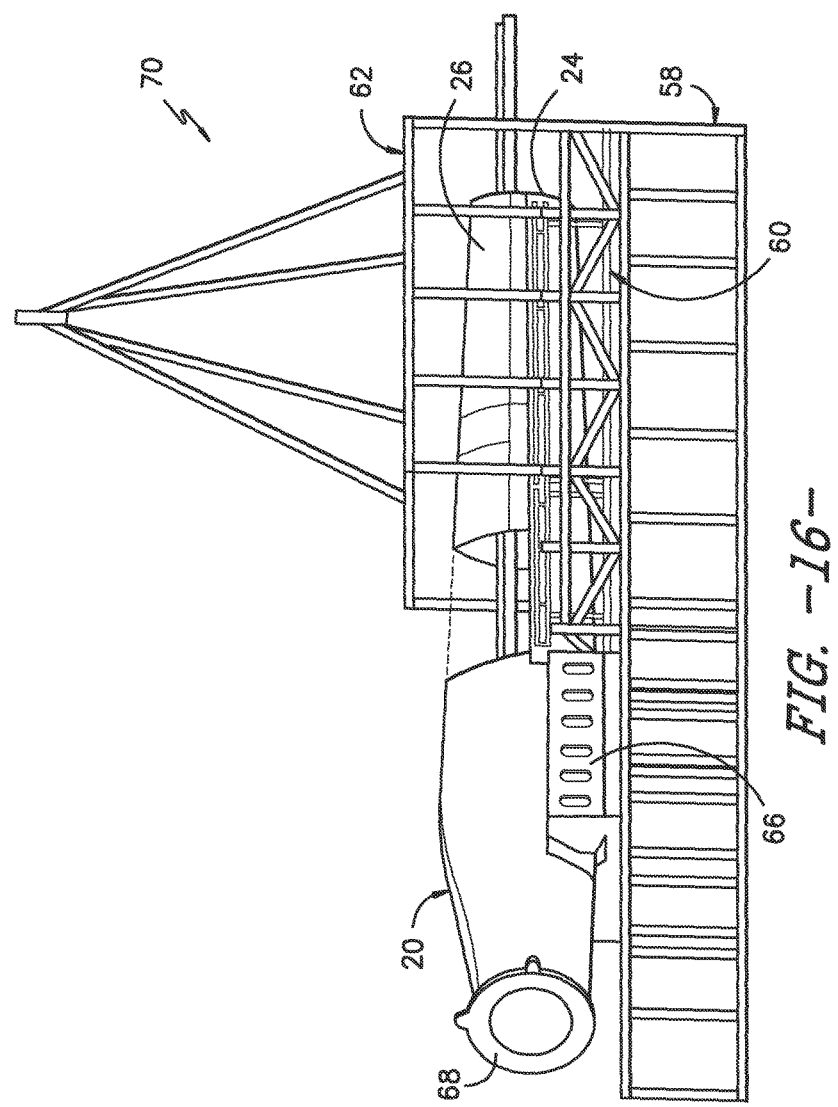

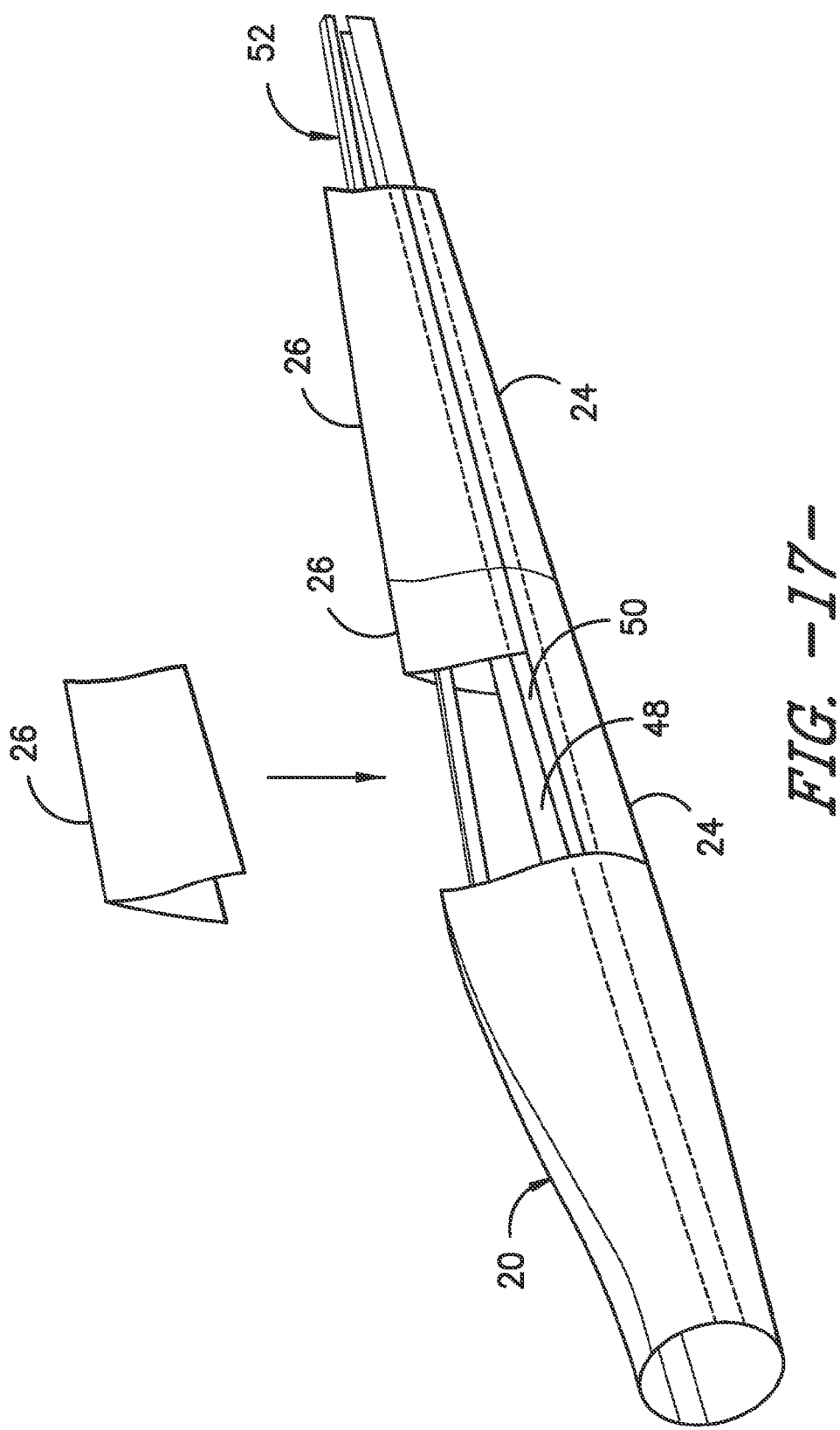
FIG. -17-

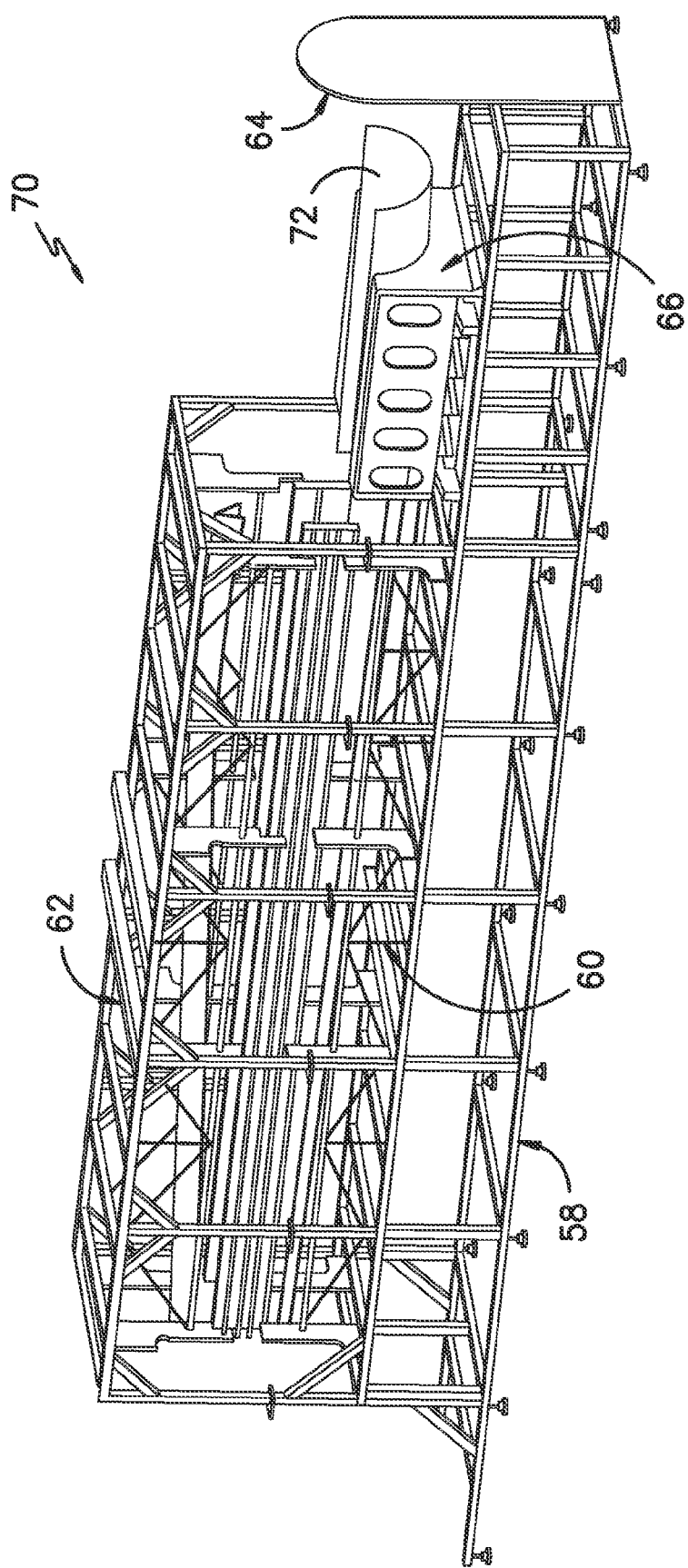
FIG. -18-

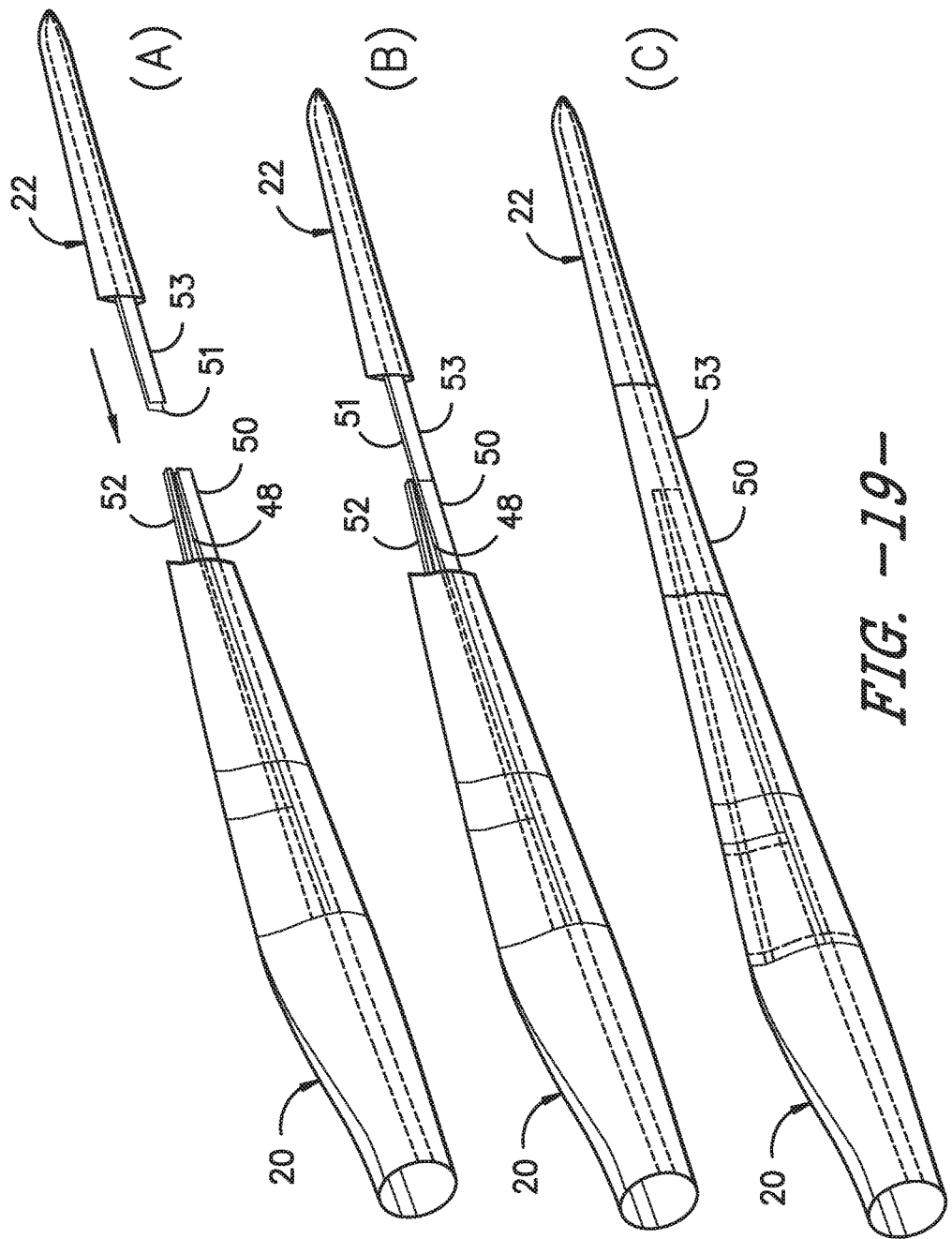
FIG. -19-

MODULAR WIND TURBINE ROTOR BLADES AND METHODS OF ASSEMBLING SAME

FIELD OF THE INVENTION

The present disclosure relates generally to wind turbine rotor blades, and more particularly to modular wind turbine rotor blades and methods of assembling same.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps may be constructed of various materials, including but not limited to glass fiber laminate composites and/or carbon fiber laminate composites.

Such rotor blades, however, are not without issues. For example, the bond lines of typical rotor blades are generally formed by applying a suitable bonding paste or compound along the bond line with a minimum designed bond width between the shell members. These bonding lines are a critical design constraint of the blades as a significant number of turbine blade field failures occur at the bond-line. Separation of the bond line along the leading and/or trailing edges of an operational turbine blade can result in a catastrophic failure and damage to the wind turbine.

In addition, the methods used to manufacture the rotor blades and/or structural components thereof can be difficult to control, defect prone, and/or highly labor intensive due to handling of the dry fabrics and the challenges of infusing large laminated structures. Moreover, as rotor blades continue to increase in size, conventional manufacturing methods continue to increase in complexity as the blade halves are typically manufactured using opposing mold halves that must be large enough to accommodate the entire length of the rotor blade. As such, joining the large blade halves can be highly labor intensive and more susceptible to defects.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade. However, known joint designs for connecting the blade segments together typically have a variety of disadvantages. For example, many known joint designs do not provide for sufficient alignment of the blade segments. As such, a significant amount of time is wasted in aligning the blade segments for assembly of the rotor blade. Additionally, many known joint designs include various complex interconnecting components, thereby increasing the amount of time needed to assemble the blade segments. In addition, segmented blades are typically heavier than blades manufactured using conventional methods due to the additional joints and/or related parts. Further, each of the segments is still manufactured using blade halves that are bonded together at leading and trailing edges, which as mentioned, is a critical design constraint.

Thus, the art is continuously seeking new and improved rotor blades and related methods that address the aforementioned issues. Accordingly, the present disclosure is directed to improved modular wind turbine rotor blades and methods of assembling same.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for assembling a modular rotor blade of a wind turbine. The method includes providing a pre-formed blade root section and a pre-formed blade tip section of the rotor blade. Further, the blade root section includes one or more spar caps extending in a generally span-wise direction. Another step includes providing at least one pre-formed blade segment of the rotor blade. The method also includes mounting the at least one blade segment around the one or more spar caps of the blade root section, wherein the at least one blade segment includes a chord-wise cross-section having multiple joints, wherein at least one joint is located on at least one of a pressure side surface or a suction side surface. In addition, the method also includes joining the blade tip section to at least one of the one or more spar caps or the at least one blade segment.

In one embodiment, the method may also include mounting a plurality of blade segments between the blade root section and the blade tip section. In another embodiment, the method may include securing a pre-formed structural component to the blade root section in a generally span-wise direction, and mounting the plurality of blade segments to the structural component. More specifically, in certain embodiments, the plurality of blade segments may include at least one continuous blade segment having a single joint having a pressure side surface and a suction side surface. Thus, in particular embodiments, the method may include separating the pressure and suction side surfaces at the single joint, mounting the continuous blade segment over the one or more spar caps, and securing the continuous blade segment between the blade root section and the blade tip section via an adhesive at the single joint.

In further embodiments, the step of mounting the plurality of blade segments between the blade root section and the blade tip section may further include securing the blade segments to at least one of the blade root section, the blade tip section, the structural component, the one or more spar caps, or adjacent blade segments via, for example, an adhesive, welding, one or more fasteners, or similar. As such, the step of mounting the blade segments can be tailored according to the materials used for each of the blade components. For example, in certain embodiments, the blade segments may be constructed of a thermoset polymer, whereas the blade root section may be constructed of a thermoplastic polymer. In such an embodiment, it may be beneficial to weld the differing materials together. In additional embodiments, it may be beneficial to mount components of a like material together via an adhesive, e.g. adjacent blade segments.

In additional embodiments, the method may also include mounting one or more shear webs between the one or more spar caps of the blade root section or the blade tip section before, for example, the step of mounting the at least one blade segment between the blade root section and the blade tip section. As such, the shear web(s) are configured to increase the rigidity in the blade root section and/or the blade tip section, thereby allowing the sections to be handled with more control.

As mentioned the blade segment(s) of certain embodiment may include at least one leading edge segment and at least one trailing edge segment. In such embodiments, the method may further include mounting at least one leading edge segment and at least one trailing edge segment between the blade root section and the blade tip section, and securing the leading edge segment and the trailing edge segment together at a pressure side seam and a suction side seam.

In further embodiments, the method may further include supporting the blade root section via a main fixture assembly during mounting of the at least one leading edge segment and the at least one trailing segment between the blade root section and the blade tip section. In addition, in certain embodiments, the method may include supporting the leading and trailing edge segments during mounting via a leading edge fixture assembly and a trailing edge fixture assembly, respectively.

More specifically, in particular embodiments, the method may include placing the at least one leading edge segment onto a leading edge fixture assembly and installing the leading edge fixture assembly onto the main fixture assembly below the blade root section when the blade root section is installed onto the main fixture assembly. As such, the method may also include mounting the at least one leading edge segment between the blade root section and the blade tip section while the leading edge segment is on the leading edge fixture assembly.

Similarly, the method may also include placing the at least one trailing edge segment onto a trailing edge fixture assembly and installing the trailing edge segment fixture assembly onto the main fixture assembly above the blade root section when the blade root section is installed onto the main fixture assembly. The method may also include installing the trailing edge fixture assembly above the blade root section, e.g. via a crane. As such, the method may also include mounting the at least one trailing edge segment between the blade root section and the blade tip section while the trailing edge segment is on the trailing edge fixture assembly.

In another aspect, the present disclosure is directed to a method for assembling a modular rotor blade of a wind turbine. The method includes providing a pre-formed blade root section and a pre-formed blade tip section of the rotor blade. The blade root section includes one or more spar caps extending in a generally span-wise direction. The method also includes providing at least one pre-formed blade segment of the rotor blade. Another step includes mounting the at least one blade segment around the one or more spar caps of the blade root section, wherein the at least one blade segment comprises a chord-wise cross-section defining a continuous blade surface. The method also includes joining the blade tip section to at least one of the one or more spar caps or the at least one blade segment.

In one embodiment, the continuous blade surface may include a single joint at a trailing edge of the blade segment, wherein the continuous blade surface comprises a pressure side surface and a suction side surface. In such an embodiment, the method may further include separating the pressure and suction side surfaces at the single joint, mounting the continuous blade segment over the one or more spar caps, joining the pressure and suction side surfaces at the single joint, and securing the continuous blade segment between the blade root section and the blade tip section.

In another embodiment, the continuous blade surface may be non-jointed. In such an embodiment, the method may also include installing the non-joined blade surface around the one or more spar caps.

In yet another aspect, the present disclosure is directed to a fixture apparatus for assembling a modular rotor blade of a wind turbine. The fixture apparatus includes a main fixture assembly configured to support and orient a pre-formed blade root section and at least one blade segment fixture assembly configured to support and orient one or more blade segments relative to the blade root section. As such, the at least one blade segment fixture assembly is configured to fit within a portion of the main fixture assembly.

In another embodiment, the fixture apparatus may include at least one leading edge fixture assembly and at least one trailing edge fixture assembly. Thus, in certain embodiments, the leading edge fixture assembly may be configured to fit below the blade root section when installed onto the main fixture assembly. In addition, the trailing edge fixture assembly may be configured to fit above the blade root section when installed onto the main fixture assembly. It should be understood, however, that the orientation of the fixture apparatus and thus the location of the leading and trailing fixture assemblies may be reversed.

In additional embodiments, the main fixture assembly of the fixture apparatus may also include a blade root plate configured to align a root end portion of the blade root section. In addition, the main fixture assembly may also include a root support structure configured to support a root end portion of the blade root section. In certain embodiments, the root support structure may further include a support pad configured to support the root end portion of the blade root section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a modular rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure along line 6-6;

FIG. 7 illustrates a cross-sectional view of the modular rotor blade of FIG. 2 according to the present disclosure along line 7-7;

FIG. 8 illustrates a cross-sectional view of another embodiment of a modular rotor blade according to the present disclosure, particularly illustrating a blade segment having overlapping pressure and suction side seams;

FIG. 9 illustrates a cross-sectional view of another embodiment of a modular rotor blade according to the present disclosure, particularly illustrating a non-jointed, continuous blade segment;

FIG. 10 illustrates a cross-sectional view of another embodiment of a modular rotor blade according to the present disclosure, particularly illustrating a single-jointed blade segment;

FIG. 11 illustrates a cross-sectional view of another embodiment of a modular rotor blade according to the present disclosure, particularly illustrating a plurality of blade segments joined together via multiple joints;

FIG. 12 illustrates a cross-sectional view of another embodiment of a modular rotor blade according to the present disclosure, particularly illustrating a plurality of blade segments joined together via multiple joints;

FIG. 13 illustrates a flow diagram of a method for assembling a modular rotor blade according to the present disclosure;

FIGS. 14-17 illustrates various schematic diagrams of one embodiment of a method for assembling a modular rotor blade of a wind turbine according to the present disclosure, particularly illustrating assembly steps that may be completed in the factory;

FIG. 18 illustrates a perspective view of one embodiment of a fixture assembly used to assemble various rotor blade components of a wind turbine according to the present disclosure; and FIG. 19 illustrates a schematic diagram of one embodiment of a method for assembling a rotor blade of a wind turbine according to the present disclosure, particularly illustrating assembly steps that may be completed in the field, e.g. at a wind turbine site.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a modular rotor blade for a wind turbine and methods of assembling same. In certain embodiments, the rotor blade includes a pre-formed blade root section, a pre-formed blade tip section, and one or more blade segments mounted between the blade root section and the blade tip section in a generally span-wise direction. In certain embodiments, the blade segments may include one or more leading edge segments, trailing edge segments, pressure side segments, suction side segments, a forward pressure side segment, a forward suction side segment, an aft pressure side segment, an aft suction side segment, or a non jointed continuous blade segment. Further, the blade root section and/or the blade tip section may each include one or more spar caps. Thus, the blade root section and the blade tip section may be joined together via their respective spar caps.

Thus, the present disclosure provides many advantages not present in the prior art. For example, the present disclosure provides a modular rotor blade having multiple blade segments and/or components that can each be individually pre-formed before assembly of the blade. Thus, the blade segments reduce the number of bond lines and shift the bond lines away from the leading and/or trailing edge regions. In addition, the number of scarf joints or similar can be reduced. Further, the modular rotor blades as described herein may increase supply chain options, may reduce assembling cycle time, and/or may reduce shipping cost. Thus, the rotor blades and methods of the present disclosure provide an economic alternative to conventional rotor blades. Further, the rotor blades of the present disclosure can have a reduced weight.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a modular rotor blade 16 manufactured according to the present disclosure are illustrated. As shown, the rotor blade 16 includes a modular configuration having a pre-formed blade root section 20, a pre-formed blade tip section 22 disposed opposite the blade root section 20, and a plurality of blade segments arranged therebetween. The blade root section 20 is configured to be mounted or otherwise secured to the rotor 18 (FIG. 1). Further, as shown in FIG. 2, the rotor blade 16 defines a span 23 that is equal to the total length between the blade root section 20 and the blade tip section 22. In addition, as shown in FIGS. 2 and 6, the rotor blade 16 defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

In addition, as shown in the illustrated embodiment, the blade segments may include a plurality of leading edge segments 24 and a plurality of trailing edge segments 26 generally arranged between the blade root section 20 and the blade tip section 22 along a longitudinal axis 27 in a generally span-wise direction. Thus, the leading and trailing edge segments 24, 26 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted.

Referring now to FIG. 4, each of the leading edge segments 24 has a forward pressure side surface 28 and a forward suction side surface 30. Similarly, as shown in FIG. 5, each of the trailing edge segments 26 has an aft pressure side surface 32 and an aft suction side surface 34. In addition, as particularly shown in FIG. 6, the leading edge segment(s) 26 and the trailing edge segment(s) 26 may be joined at a pressure side seam 36 and a suction side seam 38. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16.

In further embodiments, as shown in FIG. 8, the leading edge segment(s) 24 and the trailing edge segment(s) 26 may be configured to overlap at the pressure side seam 36 and/or the suction side seam 38. In addition, as shown in FIG. 2, adjacent leading edge segments 24 as well as adjacent trailing edge segments 26 may be configured to overlap at a seam 54. More specifically, in certain embodiments, the various segments of the rotor blade 16 may be further secured together, e.g. via an adhesive 56 configured between the overlapping leading and trailing edge segments 24, 26 and/or the overlapping adjacent leading or trailing edge segments 24, 26.

In addition, the pressure side seam 26 and/or the suction side seam 38 may be located at any suitable chord-wise location. For example, as shown in FIGS. 6 and 8, the seams 36, 38 may be located from about 40% to about 60% chord from the leading edge 40 of the rotor blade 16. More specifically, in certain embodiments, the seams 36, 38 may be located at about 50% chord from the leading edge 40. In still further embodiments, the seams 36, 38 may be located less than 40% chord or greater than 60% chord from the leading edge 40 of the rotor blade 16. In addition, in some embodiments, the seams 36, 38 may be aligned as generally shown in the figures. Alternatively, the seams 36, 38 may be offset.

In additional embodiments, as shown in FIGS. 3 and 7, the rotor blade 16 may also include at least one pressure side segment 44 and/or at least one suction side segment 46. For example, as shown in FIG. 7, the rotor blade 16 may include a pressure side segment 44 arranged and joined with a suction side segment 46 at the leading and trailing edges 40, 42. Such segments may be used in combination with and/or exclusive of the additional segments as described herein.

Thus far, the segments described herein are joined at two joint locations. Although, in further embodiments, less than two or more than two joint locations may be utilized. For example, as shown in FIG. 9, the rotor blade 16 may also include a non-jointed, continuous blade surface 45. More specifically, as shown, the non-jointed, continuous blade surface 45 does not require bonding of multiple segments. Such segments 45 may be used in combination with and/or exclusive of the additional segments as described herein. Further, as shown in FIG. 10, the rotor blade 16 may also include a blade segment having a single-jointed blade surface 55. More specifically, as shown, the single jointed blade surface 55 may include a pressure side surface 33, a suction side surface 31, and a single joint 57 at the trailing edge 42. Thus, the single-jointed blade surface 55 only requires one joint instead of multiple joints. Such segments 55 may be used in combination with and/or exclusive of the additional segments as described herein.

Moreover, as shown in FIGS. 11 and 12, the rotor blade 16 may also include a multi jointed blade surface 59. More specifically, as shown in FIG. 11, the multi jointed blade surface 59 may include a plurality of segments 41, 43, 47, 49 joined together via multiple joints 61, 63, 65, 67 spaced about the cross-section of the blade segment 59. For example, as shown, the segments 41, 43, 47, 49 may include a forward pressure side segment 43, a forward suction side segment 41, an aft pressure side segment 49, and an aft suction side segment 47. In another embodiment, as shown in FIG. 12, the blade segment 59 may include a generally J-shaped blade segment 39 and an additional blade segment, e.g. aft pressure side segment 49 or aft suction side segment 47, joined together via joints 65 and 67. More specifically, as shown, the J-shaped blade segment 39 may extend from the trailing edge 42 around the suction side surface 33 to a pressure side seam 35. Such segments may be used in combination with and/or exclusive of the additional segments as described herein.

Referring now to FIGS. 2-3 and 6-7, the rotor blade 16 may also include one or more longitudinally extending spar caps configured to provide increased stiffness, buckling resistance and/or strength to the rotor blade 16. For example, the blade root section 20 may include one or more longitudinally extending spar caps 48, 50 configured to be engaged against the opposing inner surfaces of the blade segments of the rotor blade 16. Similarly, the blade tip section 22 may include one or more longitudinally extending spar caps 51, 53 configured to be engaged against the opposing inner surfaces of the blade of the rotor blade 16. In addition, blade tip section 22 and/or the blade root section 22 may also include one or more shear webs 35 configured between the one or more spar caps 48, 50, 51, 53 of the blade root section 20 or the blade tip section 22, respectively. As such, the shear web(s) 35 are configured to increase the rigidity in the blade root section 20 and/or the blade tip section 22, thereby allowing the sections 20, 22 to be handled with more control.

More specifically, in particular embodiments, the blade root section 20 and/or the blade tip section 22 may be pre-formed with the one or more spar caps 48, 50, 51, 53. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In further embodiments, as shown in FIGS. 2, 3, 16, and 18, the rotor blade 16 may also include an additional structural component 52 secured to the blade root section 20 and extending in a generally span-wise direction. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments as described herein. For example, in certain embodiments, the structural component 52 may be secured to the blade root section 20 and may extend a predetermined span-wise distance such that the leading and/or trailing edge segments 24, 26 can be mounted thereto.

Referring now to FIGS. 13-19, various embodiments of assembling the modular rotor blade 16 as described herein are illustrated. For example, as shown in FIG. 12, a flow diagram of one embodiment of a method 100 for assembling a modular rotor blade 16 according to the present disclosure is illustrated. As shown at 102, the method 100 includes providing a pre-formed a blade root section 20 and a pre-formed blade tip section 22 of the rotor blade. Further, as mentioned and shown generally in the figures, the blade root section 20 and the blade tip section 22 each include one or more spar caps 48, 50, 51, 53 extending in a generally span-wise direction. In such embodiments, the blade root section 20 and the spar caps 48, 50 may be manufactured (e.g. infused) in a single shot or mold so as to produce a uniform, integral part. Similarly, the blade tip section 22 and the one or more spar caps 51, 53 may be in a single shot so as to produce a uniform, integral part.

As shown at 104, the method 100 may also include providing at least one pre-formed blade segment (e.g. segments 24, 26, 41, 43, 44, 45, 46, 47, or 49 as described herein) of the rotor blade 16. Further, as shown at 106, the method 100 may also include mounting one or more blade segments around the spar caps 48, 50 of the blade root section 20. More specifically, in certain embodiments, the blade segment(s) may have a chord-wise cross-section having multiple joints, with at least one of the multiple joints being located on either the pressure side surface or the suction side surface of the blade segment. Thus, in certain embodiments, the method 100 may include mounting leading and trailing edge segments 24, 26 between the blade root section 20 and the blade tip section 22 and joining the segments via the pressure and suction side seams 36, 38. In addition, the method 100 may include mounting at least one pressure side segment 44 and at least one suction side segment 46 between the blade root section 20 and the blade tip section 22 in a generally span-wise direction. In still further embodiments, where the blade segment is a single-jointed blade segment 55 (FIG. 10), the method 100 may include separating the pressure and suction side surfaces 31, 33 at the single joint 57, mounting the continuous blade segment 55 over the one or more spar caps 48, 50, and securing the continuous blade segment 55 between the blade root section 20 and the blade tip section 22 via an adhesive at the single joint 55.

In particular embodiments, as shown in FIGS. 14-16, and 18, a fixture apparatus 70 may be used to assemble the rotor blade 16. More specifically, the fixture apparatus 70 may be used to arrange and/or orient the blade segments of the rotor blade 16 such that the segments can be properly mounted between the blade root section 20 and the blade tip section 22. More specifically, as shown, the fixture apparatus 70 may include a main fixture assembly 58 that is configured to support and orient the blade root section 20, e.g. with the leading edge side down or vice versa. Further, in some embodiments, the main fixture assembly 58 may also include a blade root plate 64 configured to align a root end portion 68 of the blade root section 20 on the main fixture assembly 58. In addition, the main fixture assembly 58 may also include a root support structure 66 configured to support the root end portion 68 of the blade root section 20. In certain embodiments, as shown in FIG. 18 the root support structure 66 may further include a support pad 72 configured to provide further support and/or protection to the root end portion 68 of the blade root section 20.

In addition, as shown in FIGS. 14-16 and 18, the fixture apparatus may include a leading edge fixture assembly 60 that is configured to support and/or orient the leading edge segment(s) 24 relative to the blade root section 20. As such, the leading edge fixture assembly 60 may be installed onto the main fixture assembly 58, e.g. below the blade root section 20 when the blade root section 20 is installed onto the main fixture assembly 58. As such, the leading edge fixture assembly 60 allows the leading edge segment(s) 24 to be easily mounted between the blade root section 20 and the blade tip section 22 while the leading edge segment(s) 24 are held in place via the leading edge fixture assembly 60.

Similarly, as shown in FIGS. 14-16 and 18, the fixture apparatus 70 may also include a trailing edge fixture assembly 62 that is configured to support and/or orient the trailing edge segment(s) 26 relative to the blade root section 20. As such, the trailing edge segment(s) 26 can be loaded onto the trailing edge fixture assembly 62 and the fixture assembly 62 can be installed onto the main fixture assembly 58, e.g. above the blade root section 20 when the blade root section 20 is installed onto the main fixture assembly 58. For example, as shown in FIG. 16, the trailing edge fixture assembly 62 containing the trailing edge segment(s) 26 may be installed onto the main fixture assembly 58 above the blade root section 20 via a crane. As such, the trailing edge segment(s) may be mounted between the blade root section 20 and the blade tip section 22 while the trailing edge segment(s) 26 are held in place via the trailing edge fixture assembly 62. Thus, each of the fixture assemblies 58, 60, 62 may be used to support and arrange the various blade components/segments in a generally span-wise direction such that the components may be easily aligned and secured together to form the rotor blade 16.

More specifically, in certain embodiments, the leading edge segment(s) 24 may be loaded onto and supported by the leading edge fixture assembly 60. Further, in particular embodiments, the leading edge segment(s) 24 may be joined together, e.g. via an adhesive, while being supported on the leading edge fixture assembly 60. In addition, as shown at FIG. 15, the leading edge fixture assembly 60 may be loaded onto the main fixture assembly 58, e.g. in a lower portion of the main fixture assembly 58. Thus, as shown at FIG. 16, the leading edge fixture assembly 60 may be lifted to the blade root section 20 so as to properly locate the leading edge segment(s) 24 relative to the blade root section 20. In addition, the trailing edge segment(s) 26 may be loaded onto the trailing edge fixture assembly 62. Further, in certain embodiments, one or more adjacent trailing edge segment(s) 26 may be joined together, e.g. via an adhesive, while being supported by the trailing edge fixture assembly 62. As such, the trailing edge fixture assembly 62 may be lowered onto the main fixture assembly 58, e.g. using a crane, such that one or more of the trailing edge segment(s) 26 may be properly oriented relative to the leading edge segment(s) 24.

In additional embodiments, the method 100 may also include securing an additional structural component 52 to the blade root section 20 such that the structural component 52 extends in a generally span-wise direction. Thus, as shown at FIG. 17, the blade segments (e.g. the leading and trailing edge segments 24, 26) may be mounted to the structural component 52. For example, in one embodiment, the trailing edges segments 26 may be mounted to the structural component 52 of the blade root section 20 and the leading edge segments 24 may be mounted to the trailing edge segments 26, e.g. by overlapping the trailing edge segments 26 at seams 36, 38. In alternative embodiments, any of the blade segments as described herein may be similarly mounted to the structural component 52 of the blade root section 20 in a span-wise direction.

Thus, as shown at 108 of FIG. 13, the method 100 may also include joining the blade tip section 22 to either or both of the spar caps 51, 53 and/or one of the blade segments so as to form the modular rotor blade 16, as shown in FIGS. 19(A) and (B). In addition, the method 100 may also include mounting one or more shear webs 35 between the one or more spar caps 48, 50, 51, 53 of the blade root section 20 or the blade tip section 22 before, for example, the step of mounting the at least one blade segment between the blade root section 20 and the blade tip section 22. As such, the shear web(s) are configured to increase the rigidity in the blade root section 20 and/or the blade tip section 22.

Accordingly, once the blade root section 20 has been joined to the blade tip section 22 (and remaining internal connections of the rotor blade 16 are complete) the remaining closeout segments (e.g. pressure and suction side segments 44 and 46) may be installed over the tip-root connection to complete the rotor blade 16, e.g. as shown in FIG. 19(C).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembling a modular rotor blade of a wind turbine; the method comprising:
providing a pre-formed blade root section and a pre-formed blade tip section of the rotor blade, at least one of the blade root section or the blade tip section comprising one or more spar caps extending in a generally span-wise direction therefrom, the one or more spar caps being integral with at least one of the blade root section or the blade tip section;
providing a plurality of blade segments of the rotor blade;
arranging the plurality of blade segments with the one or more spar caps of the blade root section between the blade root section and the blade tip section, wherein, when arranged with the one or more spar caps; at least one of the plurality of blade segments comprises a chord-wise cross-section having multiple joints, wherein at least one joint is located on at least one of a pressure side surface or a suction side surface; and,
joining the blade tip section to at least one of the one or more spar caps and one of the plurality of blade segments.

2. The method of claim 1, further comprising:
securing a pre-formed structural component to the blade root section in a generally span-wise direction, and
mounting the plurality of b segments to the structural component.

3. The method of claim 1, herein arranging the plurality of blade segments further comprises;
securing the plurality of blade segments to at least one of the blade root section, the blade tip section, the structural component, the one or more spar caps, or adjacent blade segments via at least one of adhesive, welding, or one or more fasteners.

4. The method of claim 1, further comprising mounting one or more shear webs between the one or more spar caps of the blade root section or the blade tip section before arranging the plurality of blade segments between the blade root section and the blade tip section.

5. The method of claim 1, wherein the plurality of blade segments further comprise at least one leading edge blade segment and at least one trailing edge blade segment, the method further comprising:
mounting the at least one leading edge blade segment and the at least one trailing edge blade segment between the blade root section and the blade tip section, and
securing the leading edge blade segment and the trailing edge blade segment together at a pressure side seam and a suction side seam.

6. The method of claim 5, further comprising supporting the blade root section via a main fixture assembly during mounting of the at least one leading edge blade segment and the at least one trailing blade segment between the blade root section and the blade tip section.

7. The method of claim 6, further comprising supporting the at least one leading and trailing edge blade segments during mounting via a leading edge fixture assembly and a trailing edge fixture assembly, respectively.

8. The method of claim 7, further comprising:
placing the at least one leading blade segment onto a leading edge fixture assembly,
installing the leading edge fixture assembly onto the main fixture assembly below the blade root section when the blade root section is installed onto the main fixture assembly, and
mounting the at least one leading edge blade segment between the blade root section and the blade tip section while the leading edge blade segment is on the leading edge fixture assembly.

9. The method of claim 8, further comprising:
placing the at least one trailing edge blade segment onto a trailing edge fixture assembly,
installing the trailing edge blade segment fixture assembly onto the main fixture assembly above the blade root section when the blade root section is installed onto the main fixture assembly.

10. The method of claim 9, further comprising installing the trailing edge fixture assembly above the blade root section via a crane.

11. The method of claim 10, further comprising mounting the at least one trailing edge blade segment between the blade root section and the blade tip section while the trailing edge blade segment is on the trailing edge fixture assembly.

12. A method for assembling a modular rotor blade of a wind turbine, the method comprising:
providing a pre-formed blade root section and a pre-formed blade tip section of the rotor blade, at least one of the blade root section or the blade tip section comprising one or more spar caps extending in a generally span-wise direction therefrom, the one or more spar caps being integral with at least one of the blade root section or the blade tip section;

providing at least one pre-formed blade segment of the rotor blade;

arranging the at least one blade segment with the one or more spar caps of the blade root section, wherein the at least one blade segment comprises a chord-wise cross-section defining a continuous blade surface; and, joining the blade tip section at one of the one or more spar caps and the at least one blade segment.

13. The method of claim 12, wherein the continuous blade surface comprises a single joint at a trailing edge of the blade segment, wherein the continuous blade surface comprises a pressure side surface and a suction side surface, and wherein the method further comprises:

separating the pressure and suction side surfaces at the single joint, mounting the continuous blade segment over the one or more spar caps, joining the pressure and suction side surfaces at the single joint, and securing the continuous blade segment between the blade root section and the blade tip section.

14. The method of claim 12, wherein the continuous blade surface is non-jointed, wherein the method further comprises:

installing the non-jointed blade surface around the one or more spar caps.

* * * * *